United States Patent Office 3,027,227
Patented Mar. 27, 1962

3,027,227
FLUORSPAR BRIQUETTES
James R. Coxey, Reading, Pa., assignor to Glen Gery Shale Brick Corporation, Reading, Pa., a corporation of Pennsylvania
No Drawing. Filed Oct. 6, 1959, Ser. No. 844,619
2 Claims. (Cl. 23—88)

This invention relates to fluorspar briquettes and, more particularly, to fluorspar briquettes formed by an agglomeration of fluorspar fines.

Fluorspar is the commercial name for the mineral fluorite, which is chemically calcium fluoride ($CaF_2$), and which occurs in the United States and certain foreign countries, including Italy, Newfoundland, Sardinia, Mexico, and Spain. The natural product from the mining operation, whether by the open pit method or the deep shaft method, are aggregates of various sizes, together with a quantity of finely divided, powdery material of small mesh size which is termed fluorspar fines. Because of the handling involved in transportation of the aggregates from the mines to the ultimate user, a progressively larger quantity of fines is created at each stage of handling, almost all of which is nonusable and is considered waste.

Fluorspar is at present the only commercial source of fluorine, and it is necessary to the production of aluminum, steel, and hydrofluoric acid as well as in the production of products such as Freon gas, high octane gasoline, glass, and enamelware. Fluorspar is absolutely essential in the melting operation of ferrous metallurgical practice, which includes the manufacture of steel by the open-hearth process, the electric arc process, by cupola practice, and by several other known forms of steel melting. Approximately five pounds of fluorspar are presently required to flux each ton of steel, and this amount is added to the molten steel batch in its aggregate form.

Because of the excess amount of finely divided powder or fines produced each time fluorspar is handled, it is difficult, time-consuming, and costly to measure out the exact amount of fluorspar required for each batch of molten steel. Furthermore, the fines which are present with the fluorspar aggregates cannot be utilized in the charging of a steel melting furnace because of their low specific gravity, due to their finely divided condition. Instead of sinking into the molten charge, they are blown out through the flue and are lost. These charging losses, when added to the storage and handling losses due to the creation of fines, have been an added cost factor in the steel melting process and have precluded the commercial use of the one grade of fluorspar that is greatly to be preferred by virtue of its superior chemistry over presently used fluorspar material.

There are several grade classifications of fluorspar. The fluorspar presently in use in metallurgical practice is defined as "metallurgical grade" and consists of approximately 72.5% effective units of calcium fluoride. An "effective unit" of fluorspar is defined as the calcium fluoride content minus 2½ times the silica content. Silica is an impurity in fluorspar which drastically degrades its effectiveness as a flux. If the losses due to the creation of fines did not occur, then the metallurgical industry would prefer to use the classification of fluorspar defined as "acid grade," which has a minimum calcium fluoride content of 97% and a silica content usually not exceeding about 1.25%. "Metallurgical grade" never contains more than 85% calcium fluoride and may contain as much as 10% silica. Since the effectiveness of fluorspar as a flux is a direct function of the "effective units" of calcium fluoride that are available to react as a flux, then it is obvious that "acid grade" is much more effective in its intended function than is "metallurgical grade."

However, inasmuch as "acid grade" fluorspar is much more expensive than "metallurgical grade," the losses due to the occurrence of fines before the fluorspar is used has heretofore precluded its use in metallurgical practice. Hence, the use of "acid grade" fluorspar has been confined almost exclusively as a raw material source in the manufacture of hydrofluoric acid and, in turn, a source for the production of fluorine.

Attempts have been made in the past to commercially utilize the fluorspar fines by forming agglomerates, such as pellets and the like therefrom, but the binding materials which have been used in such processes form an integral part of the shaped, unified mass and degrade the effectiveness of the fluorspar material as a flux. Furthermore, they may result in impurities in the finished steel product. Thus these formed units have not been satisfactory for use in the commercial steel-making processes.

If the fluorspar fines, per se, with or without added water, are compressed into molds or dies, and heated to the necessary high temperature to form a briquette, the formed product adheres tenaciously to the mold or die and cannot be removed therefrom. If water is added to the fluorspar fines, per se, and the mixture is shaped and dried without the use of molds or dies, it immediately disintegrates upon handling.

Accordingly, it is an object of this invention to utilize the finely divided, powdery particles or fines which are formed during the handling of fluorspar aggregates or which are intentionally produced as a raw material source for the manufacture of hydrofluoric acid, and which up to now have been unusable as flux in the charging of molten steel furnaces, by agglomerating the fines into shaped, unitary masses. When the fines have been intentionally produced by conventional mineral concentration methods for use as a raw material source for the manufacture of hydrofluoric acid or other uses, the fines so produced are known as "filter-cake."

It is another object of this invention to provide a fluorspar briquette of predetermined shape and weight containing a minimum of impurities and consisting essentially of fluorspar fines which have been consolidated and interlocked to each other in such a manner that they can withstand the handling involved in transportation without dissociation into useless, finely divided powder or fines.

In attaining the objects of this invention, one feature resides in mixing the fluorspar fines with a binder material, which material remains in the mixture during the early stages of the process and permits shaping of the fines in a mold or die, and which material assists in the retention of the molded shape while drying, but which binder material is removed during the subsequent step of firing the shaped mass. During this firing step heat causes crystals at the adjoining surfaces of the fluorspar particles to grow into interlocking relationship and also causes incipient vitrification of the particles. On cooling, interlocking crystals are precipitated from the softened adjoining surfaces. In this way the fluorspar particles are consolidated into a hard, uniformly porous mass of fluorspar fines which are bound together along adjoining surfaces and which do not dissociate into useless, fine powder or fines when handled. Both the interlocking crystals grown during heating and the interlocking crystals precipitated during cooling are the result of recrystalization of the fluorspar at the adjacent surfaces of the particles.

Other objects, features, and advantages of this invention will be more apparent from the following disclosure.

In producing the fluorspar bricks of the invention, fluorspar fines are admixed with a binder having the characteristics of assisting in the formation of a shaped mass of uniformly distributed fines, such as by molding, assisting in the removal from the mold, and maintaining the shape of the mass as it is dried and subsequently fired to a sufficiently high temperature to institute incipient vitrification of the fluorspar so as to assist in consolidating and interlocking the individual fines along adjoining surfaces into a unitary, porous, hard, dense mass, not unlike a brick in appearance, wherein the particles tightly adhere to each other and do not dissociate into fines upon further handling. Furthermore, after performing the above functions, the binder material has the characteristic of being removable from the shaped mass during the firing step so that no binder material remains in the final product, which product is now uniformly porous and consists essentially of tightly bound fluorspar fines. Thus the binder material is present only in the initial phases of the process and performs the function of holding the fines together until such time that the temperature in the kiln causes the fines to bind to each other while the binder is removed, such as by volatilization, from the mass.

Included among the binders having the required characteristics and which may be used in forming the product of the invention are the products known broadly as the sulfonated lignins or ligno-sulfonates, which are principally obtained from the waste sulfite liquors resulting from the sulfite process of pulping ligno-cellulose materials, including the alkali metal ligno-sulfonates such as the sodium, potassium, ammonium, lithium, and the like.

The principal constituent of sulfite waste liquor is lignosulfonic acid, which is usually present in the form of a salt corresponding to the particular base material used in the sulfite pulping process. The most common bases are the alkali metal bases, including sodium, potassium, lithium, ammonium, etc.

As a natural occurrence during the pulping process a number of phenolic acids are found in the waste sulfite liquor, and alkali treatment of the liquor, such as with sodium hydroxide, results in the formation of alkali metal salts of the mixed phenolic acids of the waste sulfite liquor. These alkali metal salts have been found to be particularly suitable as binders for the process of the invention. A sodium salt of mixed phenolic acids obtained by the NaOH treatment of waste sulfite liquor is sold by the West Virginia Pulp and Paper Company under the trade name "Indulin C-Special." Also suitable are the phenolic derivatives of waste sulfite liquor such as are obtained by the reaction of phenol and other phenolic compounds with the waste sulfite liquor in accordance with known processes.

To agglomerate acid grade fluorspar fines, a known quantity thereof is mixed with from about 0.1 to about 0.3% by weight of a sulfonated lignin, such as an alkali metal lignosulfonate or the sodium salt of mixed phenolic acids obtained by alkali treatment of waste sulfite liquor, more or less of the lignin being required to counteract the varying degree of moisture that is native to the fluorspar fines, usually from 7 to 12% by weight. Best results are obtained when the moisture content is from 9 to 9.5%.

The mixing of a small quantity of the dry binder or an aqueous suspension of binder with a large quantity of fines can best be conducted in a mechanical counterflow mixer, and a mixing time of about ten minutes is required to form a homogeneous mixture. The time will, of course, vary with the particular mixing apparatus used. When an aqueous suspension of binder is mixed with the fluorspar fines, care must be taken that the total amount of moisture in the mixture does not exceed 12% by weight of the fluorspar. It is preferred to use a binder which is soluble in the small amount of moisture available in the fluorspar.

The mixture is then transferred to a mechanical or hydraulic ramming machine where the plungers force the prepared mixture into dies of predetermined size, the resultant shape from which has a predetermined weight. Alternatively, the masses may be shaped by hand molding. The shapes so formed are placed in a drier and dried, preferably until the moisture content is less than 0.2% by weight.

Following the drying operation, shaped units are placed in a kiln and fired at a rate of up to 8° F. per minute to a final temperature of from about 1650° F. to 1850° F. after which they are removed from the kiln and cooled to room temperature.

The firing process totally removes all traces of the binder as determined by chemical and spectrographic means so that it is apparent that the sole function of the sulfonated lignin binder is to hold the fluorspar fines together until such time that the temperature causes the fluorspar fines to bind together by recrystallization. Removal of the binder results in a uniformly porous product and a briquette of approximately five pounds can absorb about two-thirds pound of water after being immersed therein.

The following example is merely illustrative of the invention and is not to be considered limiting the scope thereof in any manner.

*Example I*

A given quantity of acid grade fines of a size such that 100% pass through a 100 mesh screen and 60% pass through a 325 mesh screen and containing 9% moisture was mixed with 0.3% by weight of a sodium salt of mixed phenolic acids obtained by alkali treatment (NaOH) of waste sulfite liquor (Indulin C-Special) until a homogeneous mixture was obtained. The mix was transferred to a mechanical ramming machine and shaped in the form of a "brick" which had a predetermined weight of about five pounds. The "bricks" that were formed were dried in a dryer and then placed in a kiln and fired at the rate of 6° per minute to a final temperature of 1750° F. after which they were removed and cooled to room temperature.

The firing process totally removed all traces of the binder as determined by chemical and spectrographic analysis.

An analysis of a sample "brick" showed that it had the following composition:

| | Percent |
|---|---|
| $CaF_2$ | 97.63 |
| $SiO_2$ | 1.04 |
| $CaO$ | 0.93 |
| $R_2O_3$ | 0.13 |
| $Cu$ | Trace |
| $Pb$ | Nil |
| $Zn$ | Nil |
| $Ba$ | 0.01 |
| Total S | Trace |
| Effective units | 95.03 |

$R_2O_3$ is a formula used by the art to indicate a mixture of certain metal oxides, such as aluminum, titanium, and iron oxides.

It has been found that best results are obtained when the kiln is fired at the rate of about 2° F. to 8° F. per minute to a final temperature of 1650° F. to 1850° F. While a rate of less than 2° F. per minute may be utilized, it unnecessarily prolongs the firing time and adds to the cost of the final product.

Specifically, "acid grade" filter-cake (100% through 100 mesh and at least 60% through 325 mesh) is preferred for the process of forming a brick-like, brick-shape, and brick-weight mass that can be charged as a flux in the steel melting process to replace the present practice of charging irregular sizes, shapes, and weights of lumpy fluorspar. By manufacturing these fluorspar briquettes in units weighing approximately five pounds each, one knowing the weight of the molten steel charge in the furnace can easily add the exact number of fluorspar briquettes necessary to accomplish the required job of fluxing, since approximately one fluorspar briquette is required for each ton of steel.

While the melting point (2480° F.) of the fluorspar briquette formed by the process of the invention is the same as ordinary lump fluorspar, the latter, when subjected to a temperature of about 1200° to 1400° F. disintegrates due to the relieving of the stresses in its structure before reaching its melting point. The briquette of the invention, on the other hand, will withstand much higher temperatures and will dissolve in a steel melt before disintegrating.

By using the shaped units of this invention, it will no longer be necessary for a steel mill to stockpile large amounts of fluorspar in enclosed facilities and sustain the substantial loss of the fluorspar which disintegrates into unusable fines. Instead it is now possible to utilize all of the fluorspar which is purchased in the shape of bricks and made in accordance with this invention. Furthermore, for the first time, it will be more economical to use the "acid grade" fluorspar for metallurgical purposes such as the various processes for forming steel because of the presence of more "effective units" of calcium fluoride, per unit of weight.

Having fully described the invention what is claimed is:

1. A pre-formed, hard, unitary, rectilinear, uniformly porous fluorspar brick resistant to powdering on handling consisting of fluorspar particles having adjoining surfaces bound together by interlocking fluorspar crystals formed and grown in situ by recrystallization.

2. A fluorspar briquette consisting of acid grade fluorspar particles consolidated into a hard, unitary, rectilinear, uniformly porous mass, said fluorspar particles having adjoining surfaces bound together by interlocking fluorspar crystals formed and grown in situ by recrystallization.

References Cited in the file of this patent
UNITED STATES PATENTS

| | | |
|---|---|---|
| 1,158,364 | Bibb | Oct. 26, 1915 |
| 2,184,078 | Hyde | Dec. 19, 1939 |
| 2,220,385 | Abbott et al. | Nov. 5, 1940 |
| 2,232,242 | Jordan | Feb. 18, 1941 |
| 2,301,456 | Sabine | Nov. 10, 1942 |
| 2,459,203 | Vahrenkamp | Jan. 18, 1949 |
| 2,465,955 | Wynne | Mar. 29, 1949 |
| 2,550,173 | Swinehart et al. | Apr. 24, 1951 |
| 2,631,083 | Engelson et al. | Mar. 10, 1953 |
| 2,914,395 | Davies | Nov. 24, 1959 |